United States Patent Office 3,437,439
Patented Apr. 8, 1969

3,437,439
PREPARATION OF ORTHOPHOSPHOROUS ACID
Robert L. Carroll, St. Louis, Mo., assignor to Monsanto Company, St. Louis, Mo., a corporation of Delaware
No Drawing. Filed Feb. 8, 1967, Ser. No. 614,553
Int. Cl. C01b 25/22
U.S. Cl. 23—165                                               11 Claims

ABSTRACT OF THE DISCLOSURE

Orthophosphorous acid can be prepared in situ by forming an aqueous reaction medium comprising water, elemental phosphorus, iodine and an effective amount of an oxidizing agent having a standard oxidation potential of less than about −0.54 volt.

---

This invention relates to the production of orthophosphorous acid. More particularly it relates to a process for producing orthophosphorous acid utilizing elemental phosphorus as a raw material.

Orthophosphorous acid ($H_3PO_3$) has heretofore been prepared by the hydrolysis of phosphorus trichloride ($PCl_3$) with water. This method requires the preparation of $PCl_3$ from elemental phosphorus, thus entails a two-step process to form orthophosphorous acid. Both the formation of $PCl_3$ and the subsequent hydrolysis to $H_3PO_3$ are reactions with which great care must be taken to avoid undesirable side reactions.

It is believed, therefore, a process which enables the production of orthophosphorous acid from elemental phosphorus in one step and which is relatively free from undesirable side reactions would be an advancement in the art.

In accordance with this invention, it has been discovered that orthophosphorous acid can be prepared by forming an acidic aqueous reaction medium comprising: water, elemental phosphorous, iodine and an oxidizing agent (of a class to be hereinafter defined), and maintaining controlled reaction conditions of temperature, pH and concentration for a time sufficient to form orthophosphorous acid. It is believed surprising that orthophosphorous acid ($H_3PO_3$) can be produced in this manner because iodine is a known oxidizing agent which is capable of oxidizing orthophosphorous acid to orthophosphoric acid.

While not desiring to be bound by the theory of this invention, it is believed the following reactions predominate. The iodine first reacts with the elemental phosphorus to form phosphorus triiodide. The phosphorus triiodide is then hydrolyzed by the water present in the reaction medium to form orthophosphorous acid and hydrogen iodide. The hydrogen iodide in turn is oxidized by the oxidizing agent to form molecular iodine which is free to react with additional phosphorus. The foregoing reactions can be written as follows:

(1)              $2P + 3I_2 \rightarrow 2PI_3$ (2)          $2PI_3 + 6H_2O \rightarrow 2H_3PO_3 + 6HI$ (3) 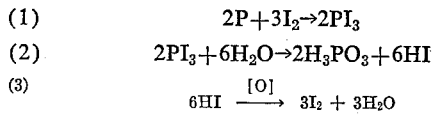

Since only minor amounts of iodine are necessary in the process of this invention, it is believed the foregoing theory of this invention is strongly supported. Additionally, if desired, certain oxidizing agents can be used which have reduced forms after the reaction with HI that can be regenerated easily to their original forms by oxidation with air or molecular oxygen, thus enabling the production of orthophosphorous acid by utilizing as raw materials elemental phosphorus, air and water.

It is also possible under certain conditions for the oxidizing agent to react directly with the elemental phosphorus in the reaction medium to form orthophosphorous acid. It is believed, however, that this oxidation of phosphorus directly to orthophosphorous acid is not appreciable because in most instances the rate of this oxidation reaction will be relatively slow and, therefore, such does not contribute significantly to the overall process.

Generally speaking, the oxidizing agents which can be used in the practice of this invention are those which will oxidize hydrogen iodide to molecular iodine in an acidic medium. Therefore, suitable oxidizing agents can be characterized by reference to their standard oxidation potentials in acidic mediums, that is, the potential (E° usually expressed in volts) of its oxidation-reduction couple relative to the potential of a hydrogen gas-hydrogen ion couple used as a standard with the comparison conducted at 25° C. with their couples in their standard states. Thus, the oxidizing agents which are suitable in the practice of this invention are those having an E° value less than (algebraically more negative) the standard oxidation potential for the iodide-iodine couple. The E° value for the iodine-iodine couple in an acidic aqueous medium is reported as −0.5355 volt.

Examples of suitable oxidizing agents which will oxidize the hydrogen iodide to molecular iodine include metallic salts having the following cations: chlorate, borate, nitrate and manganate, and the like. Additionally, any of the other molecular halogens, such as, molecular chlorine, bromine and fluorine and molecular oxygen can be used. Acid solutions of certain oxidizing compounds can also be used, such as $Sb_2O_5$, $Ag_2SO_4$, $H_2SeO_3$, Pt$(OH)_2$, $MnO_2$, $H_5IO_6$ and $NiO_2$. It is preferred however, to use molecular oxygen or the nitrogen and oxygen containing oxidizing agents, such as, nitric acid, nitrous acid, the water soluble nitrates, and the oxides of nitrogen, such as, nitric oxide, nitrous oxide, nitrogen dioxide and the like.

The term "water-soluble nitrate" is intended to include all of the nitrate ($NO_3^-$) containing compounds which are water soluble, that is, to the extent of at least about 0.05 weight percent, and which are effective oxidizing agents in acidic aqueous solutions. It includes such inorganic nitrates as, for example, alkali metal nitrates such as sodium-, potassium-, lithium, and cesium-nitrate, alkaline earth metal nitrates such as calcium-, magnesium-, barium and strontium-nitrates, as well as, ammonium nitrate. Of these, generally sodium, potassium and ammonium nitrates are preferred. In addition, other water soluble inorganic nitrates include the nitrate salts of aluminum cadmium, cobalt (II), copper (II), iron (II), iron (III), lead, nickel, silver, tin (II), zinc and the like, as well as, such complex nitrate containing salts as copper (II) amine nitrate, copper (II) tetramine nitrate, diaquotetramine nickel (II) nitrate, hexamine nickel (II) nitrate and the like. Since the oxidation of iodine apparently results from the nitrate (anion) portion of the nitrate compound, the particular source from which the nitrate anions are derived is not at all critical, provided a sufficient amount of nitrate anions are provided to effectively oxidize the iodide ion in an acidic aqueous medium. When using the water soluble nitrate salts as the source of nitrate ions, it is sometimes necessary to use a supplemental acid, such as strong mineral acids which include sulfuric acid, hydrochloric acid, nitric acid, hydrobromic acid, phosphorus acid and the like for ionizing the salt to the desired degree to provide a sufficient concentration of nitrate anions in the acidic aqueous medium and to maintain the pH of the reaction medium below 4. Since the use of nitrate salts introduces extraneous cations, the preferred oxidizing agents are nitric acid, nitrous acid and the oxides of nitrogen.

Other examples of suitable oxidizing agents can be found by reference to their standard oxidation potential listed in Oxidation Potentials, 2 ed., Wendell M. Latimer (1952), p. 342–345.

It is usually necessary to have a weight ratio of water to phosphorus of least about 1.75:1 in the process of this invention. In most instances, however, it is preferred to use larger amounts of water to aid in the dispersion of the reactants through the reaction medium, and, therefore, weight ratios of water to phosphorus of from about 3:1 to about 25:1 are preferred. There is not believed to be a critical upper limit on the amount of water that can be present; however, as a practical consideration, it is seldom, if ever, desirable to use weight ratios of water to phosphorus in excess of about 100:1, since the orthophosphorous acid prepared is usually too dilute for use.

The concentration of the oxidizing agent in the reaction medium can vary considerably and in general any concentration can be used which oxidizes hydrogen iodide to molecular iodine. Especially useful are concentrations in the reaction medium having an oxidizing ability equivalent to that obtained from the presence therein of from about 2% to about 20% by weight of nitric acid. Such concentrations are, in general, relatively dilute, e.g., below about 25% by weight of the reaction medium and especially preferred are concentrations from about 5% to about 20% by weight. It is even more particularly preferred when the nitric acid is used as the oxidizing agent to use concentration from about 8 to about 12% by weight of the reaction medium.

As previously mentioned, only minor amounts of iodine are sufficient; however, since the overall reaction rate of the process of this invention is believed to be dependent on the rate of regeneration of iodine, a suitable concentration of iodine in the reaction medium is needed to achieve practical production throughputs. It is, therefore, generally preferred to incorporate iodine in amounts of from about 0.1% to about 3% based upon the phosphorus charged to the reaction medium. With some oxidizing agents, particularly those having an E° value from about −0.54 to about −0.65, it may be preferred to use even greater amounts, that is, from about 5 to about 10% by weight based upon the phosphorus charged in order to achieve satisfactory overall reaction rates. Amounts of iodine up to about 20% by weight based upon the phosphorus charged can be used. Use of amounts of iodine in excess of 20% can result in excessive oxidation of the orthophosphorous acid to orthophosphoric acid, and, therefore, are not believed suitable.

The process of this invention is relatively independent of the order of addition of the phosphorus, water and oxidizing agent. An aqueous mixture of phosphorus and iodine can be prepared and added to an aqueous oxidizing agent solution. If desired, the iodine, phosphorus and oxidizing agent can be added to water or the iodine and oxidizing agent can be mixed together in an aqueous mixture and added to a mixture of phosphorus and water. If, however, phosphorus is added to the oxidizing agent prior to mixing with the other materials, care should be taken that the conditions are such that appreciable oxidation of phosphorus does not occur prior to reacting phosphorus with iodine. It is prefered, however, to charge an aqueous solution of the oxidizing agent to a reaction vessel equipped with a heating and cooling coil, and hold the temperature at reaction temperature and add the elemental phosphorus and iodine to the aqueous mixture of the oxidizing agent. As the materials are added, the temperature can be adjusted to maintain the preferred temperature ranges thereby forming orthophosphorous acid in accordance with the process of this invention.

It has been found that reaction temperatures of from about 20° C. to about 120° C. can be utilized, if desired. However, when higher temperatures, that is, above about 100° C. are used, more orthophosphorous acid tends to be oxidized to orthophosphoric acid. Therefore, it is preferred to utilize temperatures below about 100° C. Furthermore, reaction rates at lower temperatures are relatively slow, therefore, in obtaining an optimum reaction throughput it is preferred to utilize temperatures of from about 50° to about 100° C.

It is necessary to maintain the pH of the reaction medium below about 4 and preferably below about 2. When oxidizing agents, such as, metallic salts are used, additional strong mineral acids, such as, hydrochloric, sulfuric and the like can be used to keep the pH below about 4. When nitric acid and nitrous acid and the oxides of nitrogen are used, the pH does not normally have to be adjusted.

It is to be noted that high yields can be achieved in the practice of this invention, that is, yields of from about 50% to about 95% or even higher based upon the conversion of the phosphorus to orthophosphorous acid. It is believed surprising that yields of this magnitude are achieved, particularly since iodine is a known oxident for the oxidation of the phosphorous ion to the phosphoric ion.

It is to be noted that in most instances a mixture of oxo acids are produced. The mixtures can be used for some purposes, however, if desired, high purity orthophosphorous acid can be obtained by fractional crystallization of the mixtures. Of course, when relatively pure orthophosphorous acid is desired, reactants and reaction conditions can be selected which yield high purity orthophosphorous acid. For example, by utilizing the reaction conditions and oxidizing agents as given in Example 3, 92% of the oxo acids present in the reaction medium is orthophosphorous acid. By utilizing a slightly lower temperature, even higher percentages of orthophosphorous acid can be achieved.

As previously mentioned, use of nitric acid, nitrous acid and the oxides of nitrogen as oxidizing agents are preferred, because their reduced forms can be readily regenerated by oxidation with oxygen (air or molecular oxygen). Nitric oxide will generally be the lowest oxidation state of the nitrogen in the reaction of this invention. Only about 2½ minutes are required to convert 98% of the nitric oxide to nitrogen dioxide in a 10% mixture of nitric oxide in air at 30° C. If the oxidizing agent is regenerated by air oxidation, the only raw materials consumed are phosphorus, water and air.

The regeneration can be done either before or after separation of the reduced forms of the oxidizing agent from the orthophosphorous acid. Thus, the reaction mixture can be subjected to distillation to remove the reduced compound and the water, then this mixture can be oxidized to form $H_3NO_3$ or the reaction mixture can be subjected to oxidation followed by the separation of $H_3PO_3$ from the water and oxidizing agent. Distillation also offers a satisfactory method for conducting this latter separation step.

When minor amounts of iodine are used, there is generally no need to separate the iodine from the orthophosphorous acid. When larger amounts are used, that is, above about 2% by weight based upon the phosphorous charged, it is generally preferred to recover the iodine from the orthophosphorous acid. This can generally be accomplished by conventional means, such as, steam stripping, distillation and the like; however, in most instances, the iodine is relatively insoluble in the reaction medium, therefore, settling and subsequent decanting of the aqueous medium containing orthophosphorous acid, water and the oxidizing agent will achieve satisfactory separation. In most instances, if it is desired, the hydrogen iodide which has not been regenerated from the orthophosphorous acid can be removed by distillation or steam stripping.

Under the preferred reaction conditions, that is, at temperatures of from about 50° C. to about 100° C. and at iodine levels of from about 0.5% to about 3%, the reaction times are relatively short, that is, generally from about 5 minutes to about 3 hours. Under conditions of lower temperatures and at lower iodine levels reaction times can be longer, that is, up to 5 hours. In most instances, however, at least some orthophosphorous acid is formed almost immediately, that is, in less than one minute after the reaction conditions are attained.

The following examples are presented for illustrative ppurposes. Parts, proportions and percentages are by weight unless otherwise indicated.

Example 1

About 140 parts of 7 N nitric acid are charged into a reaction vessel equipped with a heating and cooling coil and a stirrer. The nitric acid is held at about 30° C. and about 20 parts of elemental yellow phosphorus, and a trace amount of iodine (about 0.05 part) are added. After about 3 hours, while maintaining the temperature of the mixture at 30° C., and at a pH of below 2, essentially all of the elemental phosphorus is converted to oxo acids of phosphorus. Analysis of a sample of a reaction mixture using nuclear magnetic resonance (NMR) indicates that of the oxo acids formed, about 78% is orthophosphorous acid and about 22% is orthophosphoric acid. About 30% of the reaction mixture is oxo acids of phosphorus.

Using a similar technique without the addition of the trace amount of iodine, there is no oxidation of the elemental phosphorus, even after about 5 hours.

Example 2

Using similar equipment as in Example 1, about 115 parts of 7 N nitric acid are charged into the reaction vessel. The nitric acid is heated to about 70° C. and about 43 parts of elemental yellow phosphorus and 0.25 part of iodine are added and the mixture is held at about 70° C. and at a pH of below 4 for about 1½ hours resulting in the conversion of essentially all of the phosphorus to oxo acids of phosphorus. Using the same analytical technique as in Example 1 analysis of a sample shows the oxo acids are about 71% of $H_3PO_3$ and about 29% $H_3PO_4$. About 90% of the reaction mixture is oxo acids of phosphorus.

Example 3

Using the same procedure as in Example 1 about 250 parts of 4 N nitric acid are charged into the reaction vessel. About 23 parts of elemental yellow phosphorus and 3 parts of iodine are added and the mixture maintained at 100° C. All of the phosphorus reacts within about 10 minutes and NMR analysis of a sample indicates that the oxo acids formed are about 92% orthophosphorous acid and about 8% orthophosphoric acid. About 30% of the reaction mixture is oxo acids of phosphorus.

Example 4

The reaction mixture of Example 3 is distilled to remove the water and the oxides of nitrogen from the oxo acids and the regenerated iodine. The resulting aqueous solution containing the oxides of nitrogen is subjected to oxidation by bubbling air through the solution until analysis of a sample of the solution indicates that essentially all of the oxides of nitrogen have been converted to nitric acid. The nitric acid can then be recharged to a reaction vessel for use in a process as described in Examples 1, 2 and 3.

Example 5

Using the same procedure as in Example 1, about 500 parts of 4 N nitric acid are charged into a reaction vessel. About 45 parts of elemental red phosphorus and about 7 parts of iodine are added and the mixture is maintained at about 90° C. After about 1 hour all of the phosphorus is reacted. If desired, molar equivalent amounts of nitrous acid, metallic nitrate salts and the oxides of nitrogen can be substituted for the nitric acid in the above procedure with substantially similar results.

Example 6

About 100 parts of phosphorus and about 18 parts of iodine are charged to a reaction vessel containing about 1000 parts of water. Molecular oxygen is fed subsurface to the agitating contents of the reaction vessel to create a pressure of about 5 asmospheres in the reaction vessel. The temperature is maintained at about 90° C. and additional oxygen is added to maintain the pressure at about 5 atmospheres. After the foregoing pressure and temperature conditions have been held for about 3 hours, orthophosphorous acid is crystallized from the reaction medium using fractional crystallization and is suitable as a raw material in the production of organo phosphorus compounds.

What is claimed is:

1. A process for producing orthophosphorous acid comprising (a) forming an aqueous reaction medium comprising water, elemental phosphorus in a weight ratio of at least about 1.75:1, respectively, iodine in an amount less than about 20% by weight based upon the amount of phosphorus charged and an effective amount of an oxidizing agent having a standard oxidation potential of less than about −0.54 volt and (b) maintaining said reaction medium at a temperature of from about 20° C. to about 120° C. and at a pH below about 4 for a sufficient time to form orthophosphorous acid.

2. A process according to claim 1 wherein said temperature is from about 50° C. to about 100° C.

3. A process according to claim 2 wherein a mixture of said oxidizing agent and water are formed and thereafter said phosphorus and said iodine are added thereto in any order.

4. A process according to claim 3 wherein said oxidizing agent is selected from a group consisting of nitric acid, nitrous acid and the oxides of nitrogen.

5. A process according to claim 4 wherein said oxidizing agent is nitric acid.

6. A process according to claim 1 wherein said oxidizing agent is selected from a group consisting of molecular oxygen, nitric acid, nitrous acid, metallic nitrate salts of oxides of nitrogen and mixtures thereof.

7. A process according to claim 6 wherein said oxidizing agent is molecular oxygen.

8. A process according to claim 6 wherein said oxidizing agent is nitric acid.

9. A process according to claim 8 wherein said temperature is from 50° C. to 100° C.

10. A process according to claim 9 wherein said iodine is present in amounts of from about 0.1% to about 3% by weight of phosphorus.

11. A process according to claim 10 wherein air oxidation is used to regenerate nitric acid.

OTHER REFERENCES

Van Wazer: "Phosphorus and its Compounds," vol. 1 pp. 220, 221, 227 and 228 (1958).

J. Kolitowska, Roczniki Chem., vol. 27, pp. 191–206 (1953).

OSCAR R. VERTIZ, *Primary Examiner.*

ARTHUR GREIF, *Assistant Examiner.*